US008894316B2

(12) United States Patent
Kallas et al.

(10) Patent No.: US 8,894,316 B2
(45) Date of Patent: Nov. 25, 2014

(54) ADJUSTABLE JOINT FOR MICROPHONE

(75) Inventors: Ryan Kallas, Paulsbo, WA (US); J. Herschel Blankenship, Bainbridge Island, WA (US)

(73) Assignee: Music Express, LLC, Bainbridge Island, WA (US)

( * ) Notice: Subject to any disclaimer, the term of this patent is extended or adjusted under 35 U.S.C. 154(b) by 629 days.

(21) Appl. No.: 12/802,597

(22) Filed: Jun. 10, 2010

(65) Prior Publication Data
US 2011/0020055 A1 Jan. 27, 2011

Related U.S. Application Data

(63) Continuation-in-part of application No. 29/340,621, filed on Jul. 22, 2009, now Pat. No. Des. 618,222, and a continuation-in-part of application No. 29/340,623, filed on Jul. 22, 2009, now Pat. No. Des. 617,781.

(51) Int. Cl.
*F16C 11/06* (2006.01)
*H04R 1/08* (2006.01)
*F16M 11/14* (2006.01)

(52) U.S. Cl.
CPC ......... *F16M 11/14* (2013.01); *F16M 2200/022* (2013.01); *H04R 1/08* (2013.01)
USPC .......................................................... 403/90

(58) Field of Classification Search
USPC ............. 403/54, 55, 56, 76, 84, 90, 113, 114, 403/144, 362, 122, 373; 248/288.31, 248/288.51, 481, 181.2; 269/75, 76, 80, 83, 269/58, 71
See application file for complete search history.

(56) References Cited

U.S. PATENT DOCUMENTS

| | | | | |
|---|---|---|---|---|
| 1,474,854 A | * | 11/1923 | Spire | 74/579 R |
| 1,579,907 A | * | 4/1926 | Zink | 248/481 |
| 1,688,148 A | | 10/1928 | Martin | |
| 1,780,383 A | * | 11/1930 | Green | 248/181.2 |
| 2,089,439 A | * | 8/1937 | Silberstein | 248/181.1 |
| 2,122,778 A | | 7/1938 | Mueller | |
| 2,298,176 A | | 10/1942 | Rodney | |
| 2,332,504 A | * | 10/1943 | Brenner | 248/181.1 |

(Continued)

FOREIGN PATENT DOCUMENTS

FR 2679968 A1 * 2/1993 ............. F16C 11/10

OTHER PUBLICATIONS http://www.supplierlist.com/product_view/nbyte/144773/100701_/rubber_barrel_microphone_holder.htm; Model No. TYA-01, Rubber Barrel Microphone Holder 2 pages; printed Nov. 25, 2009.

(Continued)

*Primary Examiner* — Michael P Ferguson
*Assistant Examiner* — Daniel Wiley
(74) *Attorney, Agent, or Firm* — J. Bennett Mullinax, LLC

(57) ABSTRACT

An adjustable joint for use with a microphone is provided that includes a ball and a stem connected to the ball. The ball is located within a ball housing that defines a slot that has a length that extends along a portion of a front side and an end of the ball housing. The maximum width of the slot at the end of the ball housing is different than the maximum width of the slot at the front side of the ball housing. The adjustable joint allows for reorientation of an attached microphone.

17 Claims, 8 Drawing Sheets

(56) References Cited

U.S. PATENT DOCUMENTS

| | | | |
|---|---|---|---|
| 2,382,100 A | 11/1944 | Rodney | |
| 2,421,437 A | 8/1947 | Ryan | |
| 2,434,440 A | 1/1948 | Julius | |
| 2,672,313 A * | 3/1954 | Poole | 248/182.1 |
| 2,752,116 A * | 6/1956 | Minnis | 248/181.1 |
| 2,776,482 A | 1/1957 | Burrougha | |
| 3,128,982 A | 4/1964 | Christopher | |
| 3,278,207 A | 10/1966 | Barish | |
| 3,324,254 A | 6/1967 | Shaw | |
| 3,341,230 A * | 9/1967 | Wichers | 285/266 |
| 3,562,446 A | 2/1971 | Wolf | |
| 3,632,073 A * | 1/1972 | Nakatani | 248/169 |
| D227,742 S | 7/1973 | Logdson | |
| 3,781,093 A * | 12/1973 | Grabijas | 359/876 |
| 3,783,547 A * | 1/1974 | Bystrom et al. | 43/21.2 |
| 4,226,550 A | 10/1980 | Kupcak | |
| 4,447,139 A * | 5/1984 | Biber | 359/384 |
| 4,492,488 A | 1/1985 | Warshawsky | |
| 4,579,009 A * | 4/1986 | Carmichael et al. | 73/863 |
| D291,650 S | 9/1987 | Monzen | |
| 4,708,510 A * | 11/1987 | McConnell et al. | 403/90 |
| 4,787,613 A * | 11/1988 | Hayes | 269/75 |
| D305,026 S | 12/1989 | Wolf | |
| 5,118,058 A * | 6/1992 | Richter | 248/183.2 |
| 5,224,692 A * | 7/1993 | Anderson et al. | 269/75 |
| 5,419,522 A * | 5/1995 | Luecke et al. | 248/288.51 |
| 5,505,415 A * | 4/1996 | Brett | 248/168 |
| 5,775,654 A * | 7/1998 | Price | 248/231.61 |
| 5,806,821 A * | 9/1998 | Phillips et al. | 248/288.51 |
| 5,839,712 A * | 11/1998 | Wang | 248/316.2 |
| 5,957,445 A * | 9/1999 | Hagman et al. | 269/75 |
| 6,164,843 A * | 12/2000 | Battocchio | 396/419 |
| 6,219,429 B1 | 4/2001 | Chung | |
| 6,254,044 B1 * | 7/2001 | Lee | 248/177.1 |
| D447,472 S | 9/2001 | McGugan | |
| 6,352,228 B1 * | 3/2002 | Buerklin | 248/181.1 |
| D464,944 S | 10/2002 | Lee et al. | |
| 6,532,711 B2 * | 3/2003 | Gregel et al. | 52/583.1 |
| 6,560,346 B2 | 5/2003 | Ohta et al. | |
| 6,570,992 B1 | 5/2003 | Folan | |
| 6,625,293 B1 | 9/2003 | Nageno | |
| 6,671,382 B2 | 12/2003 | Chen | |
| D490,399 S | 5/2004 | Kamo et al. | |
| D497,156 S | 10/2004 | Bauman | |
| 6,842,528 B2 | 1/2005 | Kuerti | |
| D507,591 S | 7/2005 | Kamijima et al. | |
| 6,922,475 B2 | 7/2005 | Hsieh | |
| 7,007,901 B2 * | 3/2006 | Kondo | 248/75 |
| 7,100,881 B2 | 9/2006 | Worrall | |
| D548,729 S | 8/2007 | Miller | |
| 7,300,028 B2 * | 11/2007 | Vogt | 248/181.1 |
| 7,341,017 B2 * | 3/2008 | Jackson | 114/343 |
| D579,928 S | 11/2008 | Murata | |
| 7,461,995 B2 * | 12/2008 | Burnley | 403/122 |
| D617,781 S | 6/2010 | Kallas et al. | |
| D618,222 S | 6/2010 | Kallas et al. | |
| 7,753,330 B2 * | 7/2010 | Brief | 248/278.1 |
| 7,959,120 B2 * | 6/2011 | Liao | 248/278.1 |
| 7,993,069 B2 * | 8/2011 | Persson | 403/56 |
| 8,021,060 B2 * | 9/2011 | Sudhana et al. | 396/428 |
| 8,534,951 B2 * | 9/2013 | Komine et al. | 403/56 |
| 2005/0001116 A1 * | 1/2005 | Vogt | 248/177.1 |
| 2006/0175482 A1 * | 8/2006 | Johnson | 248/176.1 |
| 2008/0023607 A1 * | 1/2008 | Barker | 248/288.51 |
| 2011/0020055 A1 | 1/2011 | Kallas et al. | |
| 2011/0147548 A1 * | 6/2011 | Kang | 248/181.2 |

OTHER PUBLICATIONS http://www.radioshack.com/product/index.jsp?productId=2102932; Jumbo-Size Heavy-Duty Microphone Holder, Model: 33-4009, Catalog#: 33-4009'3 pages; printed Nov. 25, 2009.
http://www.sweetwater.com/store/detail/UltiBoomTB , Item ID. UltiBoomTB, 2 pages; printed Dec. 11, 2009.
http://www.bhphotovideo.com/c/product/38174-REG/Norman__812290__Boom__Arm__Assembly; B&H# NOBA Mfr#812290; 2 pages; printed Dec. 11, 2009.
International Search Report and the Written Opinion—Access Products Group LLC et al.; PCT/US2011/001662 (8 pgs).

* cited by examiner

ADJUSTABLE JOINT FOR MICROPHONE

CROSS REFERENCE TO RELATED APPLICATION

This application is a continuation-in-part and claims the benefit of U.S. application Ser. No. 29/340,621 filed on Jul. 22, 2009 and entitled, "Equipment Stand" that will issue on Jun. 22, 2010 having U.S. Pat. No. D618222 and whose entire contents are incorporated by reference herein in their entirety for all purposes. This application is also a continuation-in-part and claims the benefit of U.S. application Ser. No. 29/340,623 filed on Jul. 22, 2009 and entitled, "Boom Arm" that will issue on Jun. 15, 2010 having U.S. Pat. No. D617781 and whose entire contents are incorporated by reference herein in their entirety for all purposes.

FIELD OF THE INVENTION

The present invention relates generally to an adjustable joint for use with a microphone. More particularly, the present application involves an adjustable joint for a microphone that allows for constrained swiveling adjustment of an attached microphone or portion of a microphone stand or boom to which the microphone is attached.

BACKGROUND

Microphones are used by performers and speakers during performances and may be either held in the hand of the user or placed onto a stand during use. The use of a microphone stand allows the microphone to be located and fixed at a desired position thus allowing actors, musical performers, or other users free use of their hands and a consistent, known placement of the microphone. During certain performances, a user may desire that the position of the microphone be adjusted. In such instances, the stand to which the microphone is mounted may feature an adjustable joint that includes a wing nut that can be loosened in order to cause two plates that were interlocked through complimentary teeth and urged against one another to be separated. The user may adjust the microphone or the portion of the microphone stand holding the microphone about a pivot axis that extends in a horizontal direction. Once the microphone is oriented to the desired position, the user may tighten the wing nut thus causing the two plates to be urged against one another and subsequently relocked through interlocking of the complimentary teeth of the two plates. Although such adjustment mechanisms are capable of adjusting a microphone during use, they are limited in their range of adjustment and thus limited in applicability. As such, there remains room for variation and improvement in the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
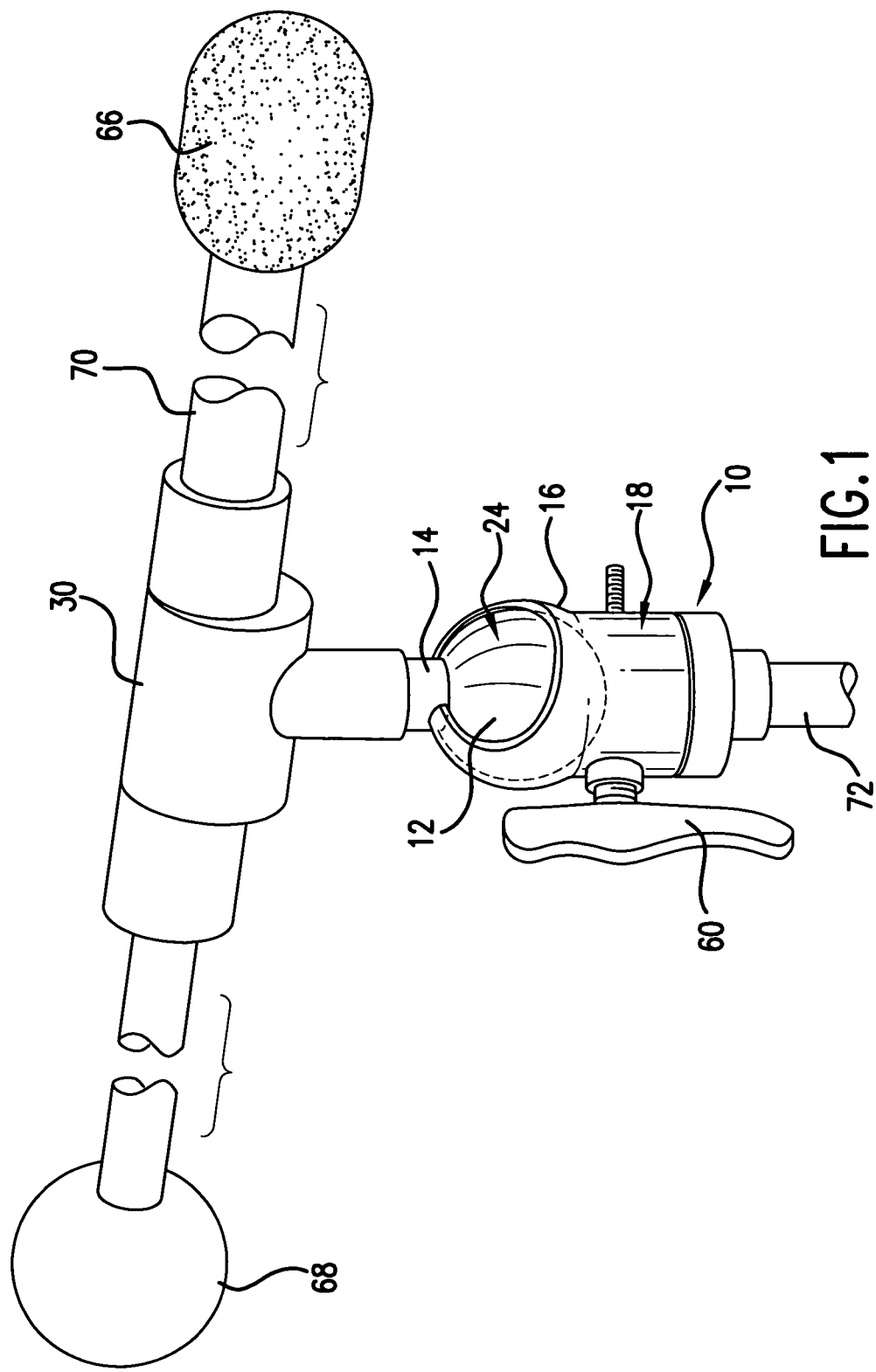
FIG. 1 is a perspective view of a microphone stand that employs an adjustable joint in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an adjustable joint 10 used in connection with a microphone 66 that allows adjustment in certain orientations and prevents adjustment in other orientations. A performer using the microphone 66 during a performance may desire the microphone 66 be moved along a single arc. In such instances, the orientation of the microphone 66 in some directions other than in the direction of the single arc may be limited. However, the microphone 66 may be afforded a greater range of movement when adjusted into positions outside of a portion of the single arc. The adjustable joint 10 thus restricts certain ranges of movement of the microphone 66.

FIG. 1 illustrates an exemplary embodiment of the adjustable joint 10 used in connection with a microphone 66 that is affixed to the end of a boom 70. A boom clutch 30 is attached to one end of the boom 70, and a counterweight 68 is attached to the opposite end of the boom clutch 30. A column 72 provides vertical height for the assembly, and the adjustable joint 10 is attached to the top of the column 72. The boom clutch 30 is attached to the end of the adjustable joint 10 opposite from the attachment position of the column 72. The orientation of the boom clutch 30, counterweight 68, boom 70, and microphone 66 can be adjusted with respect to the column 72 upon actuating the adjustable joint 10. Once positioned into a desired orientation, the position of the boom clutch 30, counterweight 68, boom 70, and microphone 66 can be fixed upon locking of the adjustable joint 10 by the user.

FIGS. 2-5 illustrate an adjustable joint 10 in accordance with one exemplary embodiment that includes a ball and socket connection that is used to afford repositioning of the microphone 66. A ball housing 16 is present that houses a ball 12. A stem 14 extends from the ball 12 and has a male slot joint 34 located at its upper end. The boom clutch 30 may feature a complimentary female joint that receives the male slot joint 34 of the stem 14 so as to effect attachment of the boom clutch 30 to the adjustable joint 10. However, it is to be understood that a variety of attachment mechanisms may be used to attach the adjustable joint 10 to the boom clutch 30, microphone 66, or other component. In yet other embodiments, the boom clutch 30, microphone 66, or other component may be integrally formed with the stem 14.

The ball 12 and the inner surface of the ball housing 16 can be complimentary in shape so that the ball 12 can rotate freely within the ball housing 16. The material of the ball 12 can be selected so as to give the outer surface of the ball 12 a rough matte finish. Further, the inner surface of the ball housing 16 may be variously configured to provide desired friction against the ball 12 so that an ease of movement between the ball 12 and the ball housing 16 may be realized. The inner surface of the ball housing 16 may be unpainted in certain embodiments to prevent paint from rubbing off onto the surface of the ball 12 during use.

Figure 2:
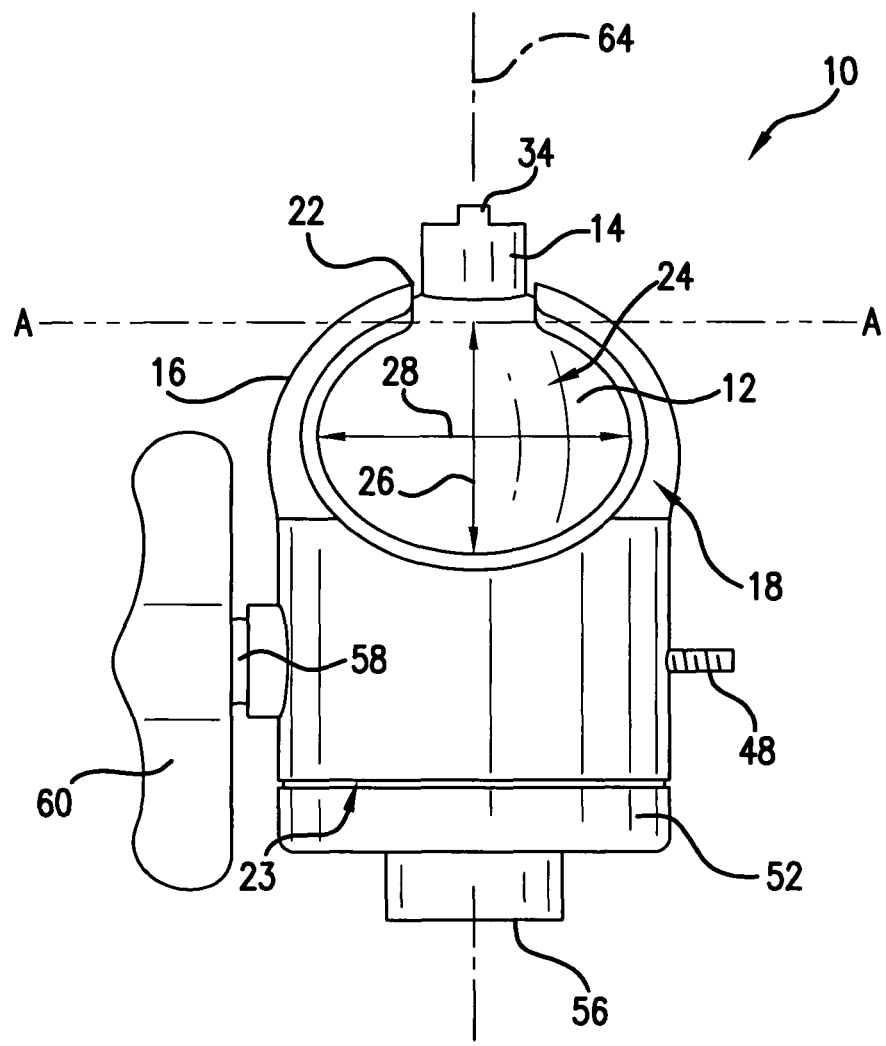
FIG. 2 is a front view of an adjustable joint in accordance with one exemplary embodiment.

The ball housing 16 has a front side 18 denoted generally as the portion of the outer surface of the ball housing 16 below line A-A in FIG. 2. The ball housing 16 has an end 22 that is the portion of the outer surface of the ball housing 16 above line A-A. A slot 24 is defined in the ball housing 16. The slot 24 is located on a portion of the front side 18 and has a length 26 that extends into the end 22. The length 26 of the slot 24 extends completely across the end 22 to a back side 20 of the ball housing 16 and is present over a portion of the back side 20. The back side 20 of the ball housing 16 is denoted as the portion of the outer surface of the ball housing 16 below line A-A and opposite from the front side 18. As such, the length 26 of the slot 24 may extend from the front side 18, across the entire end 22, and onto the back side 20. The length 26 of the slot 24 may be both arc shaped and linear shaped in certain embodiments. In yet other arrangements, the length 26 can be completely arc shaped and may have the same radius or may have different radii at certain locations.

Figure 3:
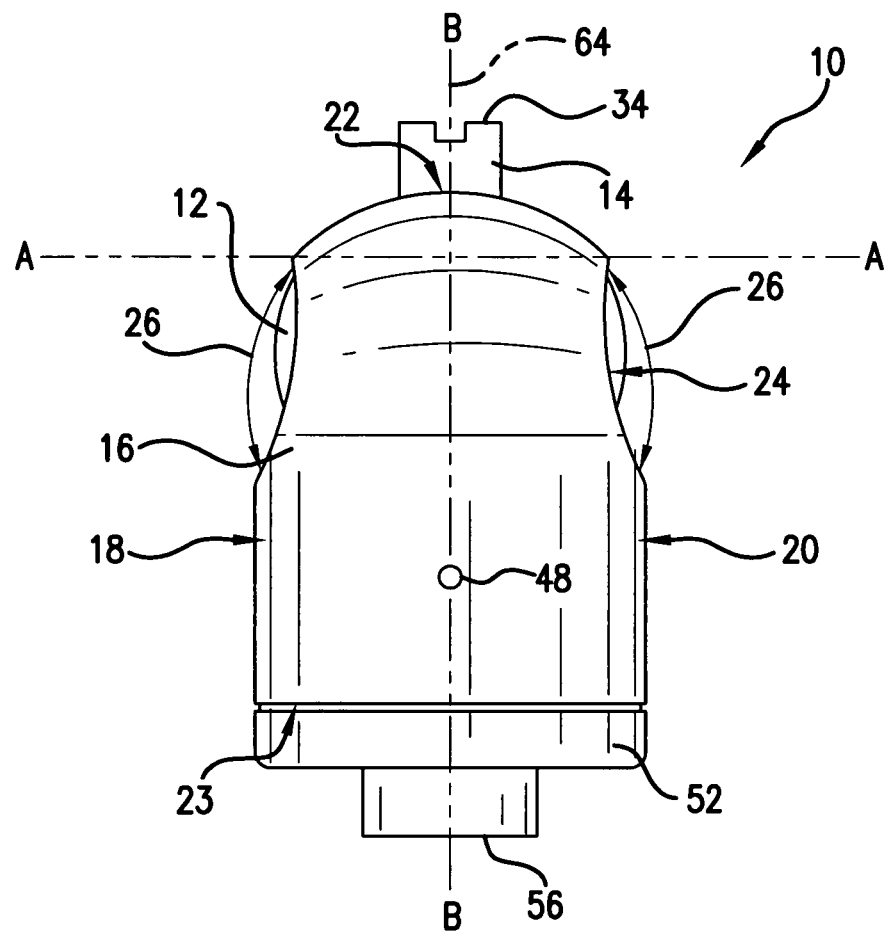
FIG. 3 is a side view of the adjustable joint of FIG. 2.
Figure 4:
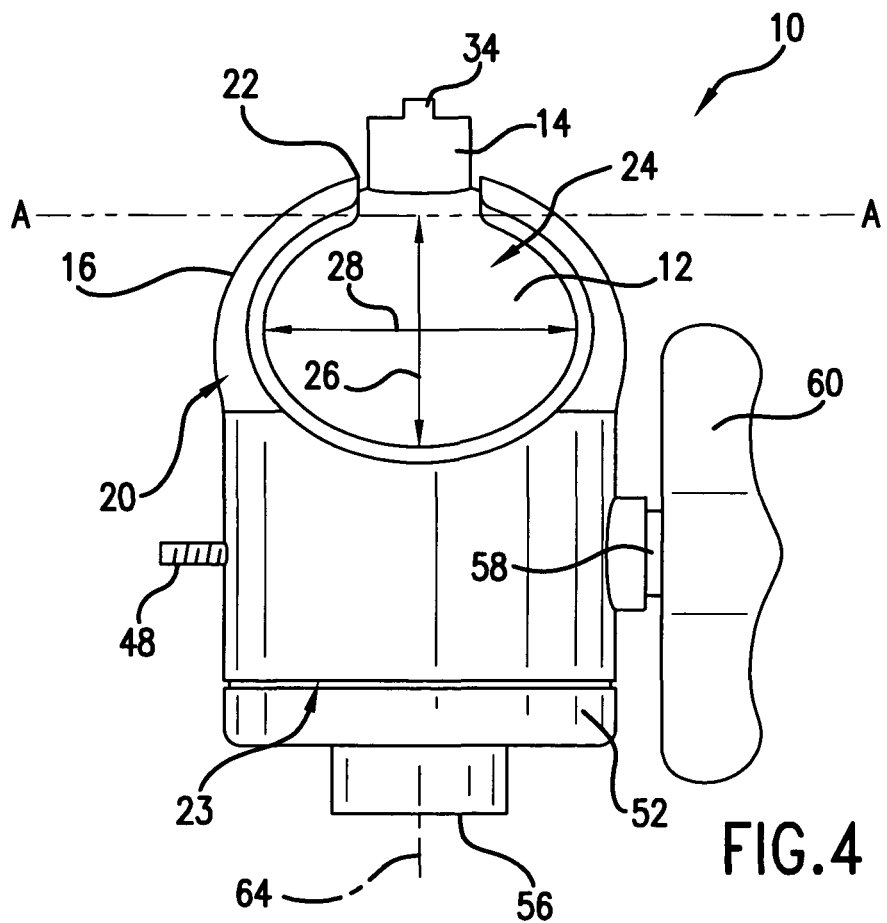
FIG. 4 is a back view of the adjustable joint of FIG. 2.
Figure 5:
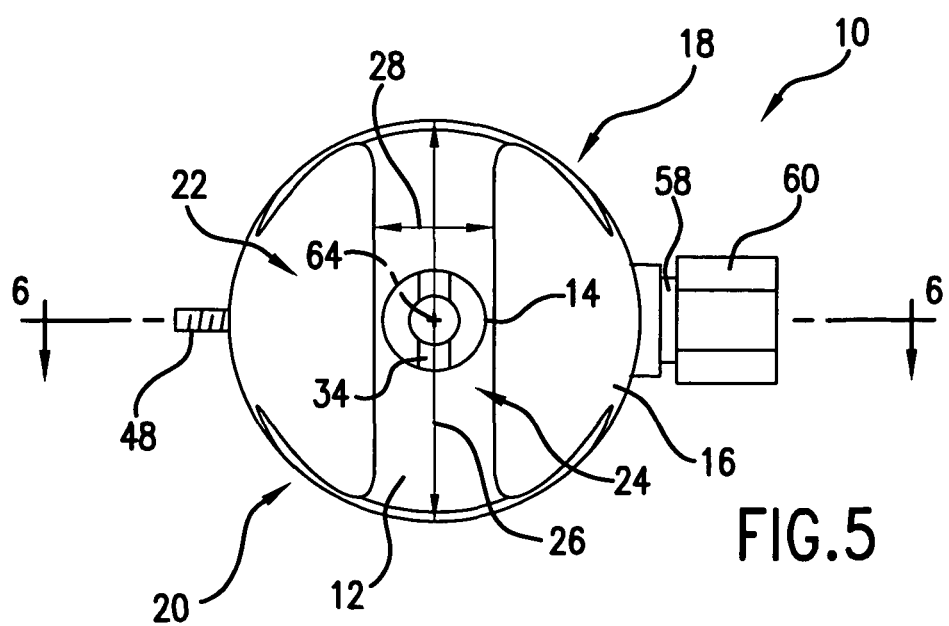
FIG. 5 is a top view of the adjustable joint of FIG. 2.

The width 28 of the slot 24 may be varied along the length 26 of the slot 24. As shown in FIG. 2, the slot 24 has a generally oval shape at the front side 18. The width 28 of the slot 24 increases and then decreases along the length 26 at the front side 18. With reference to FIG. 5, the width 28 of the slot 24 is constant along the length 26 at the end 22. However, it is to be understood that the width 28 need not be constant in accordance with other exemplary embodiments along the entire length 26 of the slot 24 at the end 22. FIG. 4 shows the slot 24 having a generally oval shape at the back side 20. Here, the width 28 increases and then decreases along the length 26 at the back side 20. The shape and size of the slot 24 at the front side 18 is the same as the shape and size of the slot 24 at the back side 20. However, it is to be understood that the shape and/or size of the slot 24 at the front side 18 may be different than the shape and/or size of the slot 24 at the back side 20 in other embodiments. The width 28 of the slot 24 at the end 22 is less than the maximum width 28 of the slot 24 at the front side 18 and is less than the maximum width of the slot 24 at the back side 20. In the exemplary embodiment shown, the slot 24 is symmetrical in shape. However, it is to be understood that other arrangements are possible in which the slot 24 is asymmetrical. The front side 18 and the back side 20 can be identified as being on opposite sides of line B-B as shown in FIG. 3 that bisects the center of the ball housing 16. The front side 18 and back side 20 may also both be below the end 22 that is located above line A-A. The front side 18 and back side 20 may make up 360° of the outer surface of the ball housing 16 along portions of the ball housing 16 below the end 22.

The variations in width 28 along the length 26 of the slot 24 allow for different ranges of movement of the ball 12 to be realized depending upon the stem's 14 location along the length 26. The stem 14 extends from the ball 12, and movement of the ball 12 within the ball housing 16 will cause the stem 14 to be likewise moved due to their rigid attachment. The stem 14 may be moved against the ball housing 16 to thus limit the movement of the ball 12 with respect to the ball housing 16. In this manner, the range of movement of the microphone 66 can be controlled in a desired fashion. The range of movement of the ball 12 and stem 14 may be greatest at the front side 18 and back side 20 and can be the least at the end 22. However, it is to be understood that other arrangements are possible in which the maximum width 28 at the end 22 is greater than the maximum width 28 at the front side 18 and/or back side 20. As shown with reference to FIG. 7, a stem screw 32 may be used in order to effect attachment of the stem 14 to the ball 12. In other arrangements, the ball 12 and stem 14 may be integrally formed with one another. In yet other exemplary embodiments, various means may be used to attach the stem 14 to the ball 12.

Figure 8:
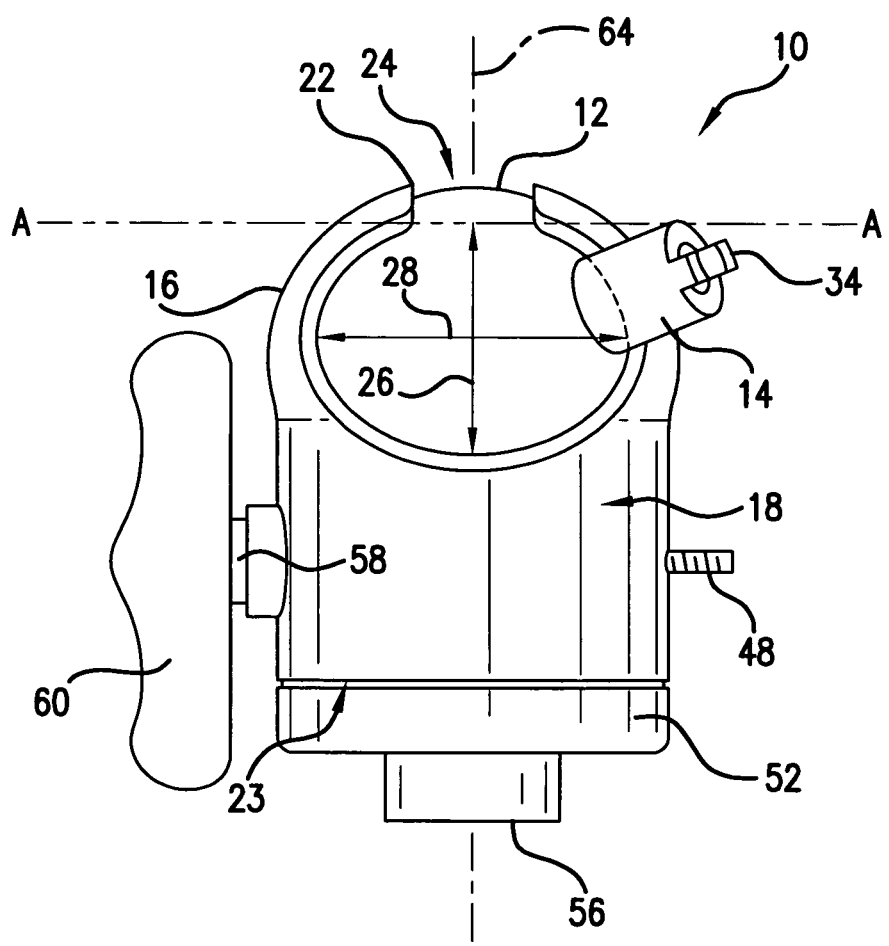
FIG. 8 is a front view of the adjustable joint of FIG. 1 in which a stem is positioned against the ball housing.

FIG. 8 shows the stem 14 located in the slot 24 at the front side 18 of the ball housing 16. The slot 24 is wider at the front side 18 than at the end 22 thus affording a greater range of motion of the stem 14 at portions of this location. The stem 14 contacts the edge of the ball housing 16 at the slot 24 and thus has its range of motion limited at this point.

Referring back to FIGS. 1-5, the end 22 of the ball housing 16 has an outer surface that is curved in shaped. The length 26 of the slot 24 at the end 22 follows the path of an arc and likewise is curved in shape. The stem 14 and components attached to the stem 14 are thus limited in movement along the arc length 26 of the slot 24 upon being moved through the slot 24 at the end 22. As such, the microphone 66 may be limited in movement along an arc when so adjusted during a performance. Placement of the stem 14 within the slot 24 at either the front side 18 or back side 20 of the ball housing 16 allows for the stem 14 and components attached to the stem 14 to be adjusted outside of the arc length 24 of the slot 24 at the end 22 because the slot 24 has a greater width 28 at locations at the front side 18 and back side 20. Although described as affording no movement in the width 28 direction at the end 22, it is to be understood that certain exemplary embodiments exist in which the stem 14 may move some amount in the width 28 direction due to the fact that the slot 24 at the end 22 is slightly wider than the stem 14. In this regard, the stem 14 can move some limited amount in the width 28 direction at the end 22 so that clearance is afforded between the stem 14 and the ball housing 16 at the end 22. In other arrangements, the stem 14 may be as wide as the slot 24 at the end 22 so that no movement in the width 28 direction is realized. In this regard, there will be an interference fit between the stem 14 and the ball housing 16 at the end 22 so that a user will have to exert some amount of force to move the stem 14 through the slot 24 at the end 22.

As discussed, the ball 12 is retained within the ball housing 16 and forms a ball and socket type connection that is limited in movement at certain degrees due to the particular shape of slot 24. The stem 14 that extends from ball 12 has a stem axis 64. The ball 12 is retained within the ball housing 16 in such a manner that the ball 12 may rotate completely 360° about the stem axis 64. As such, the ball 12, attached stem 14, and components attached to the stem 14 such as the microphone 66 may be free to rotate 360° about the stem axis 64. This rotational freedom may be present regardless of the location of the stem 14 in the slot 24. As such, the stem 14 may be free to rotate about the stem axis 64 when the stem 14 is in the slot 24 at the end 22 or is in the slot 24 at the front side 18 or back side 20 of the housing. Therefore, the ball 12, attached stem 14, and components attached to the stem 14 such as the microphone 66 can rotate 360° about the stem axis 64 when in the slot 24 at the end 22 even though movement is limited in the arc length 26 direction at the end 22 due to the shape of the slot 24 at the end 22. However, it is to be understood that other arrangements of the adjustable joint 10 are possible in which the ball 12, stem 14, and components attached to the stem 14 such as the microphone 66 are limited or even prevented from rotating about the stem axis 64.

The slot 24 may be formed in the ball housing 16 so that the edges of the ball housing 16 at the front side 18 and back side 20 are concave in shape along their entire lengths at the front side 18 and back side 20. Further, the slot 24 may be arranged so that the edges of the ball housing 16 at the end 22 are convex in shape along their entire lengths at the end 22. However, the edges of the ball housing 16 need not be arranged in these manners in other exemplary embodiments. For example, the edges of the ball housing 16 may be linear at certain locations, or may be concave at the end 22.

Figure 6:
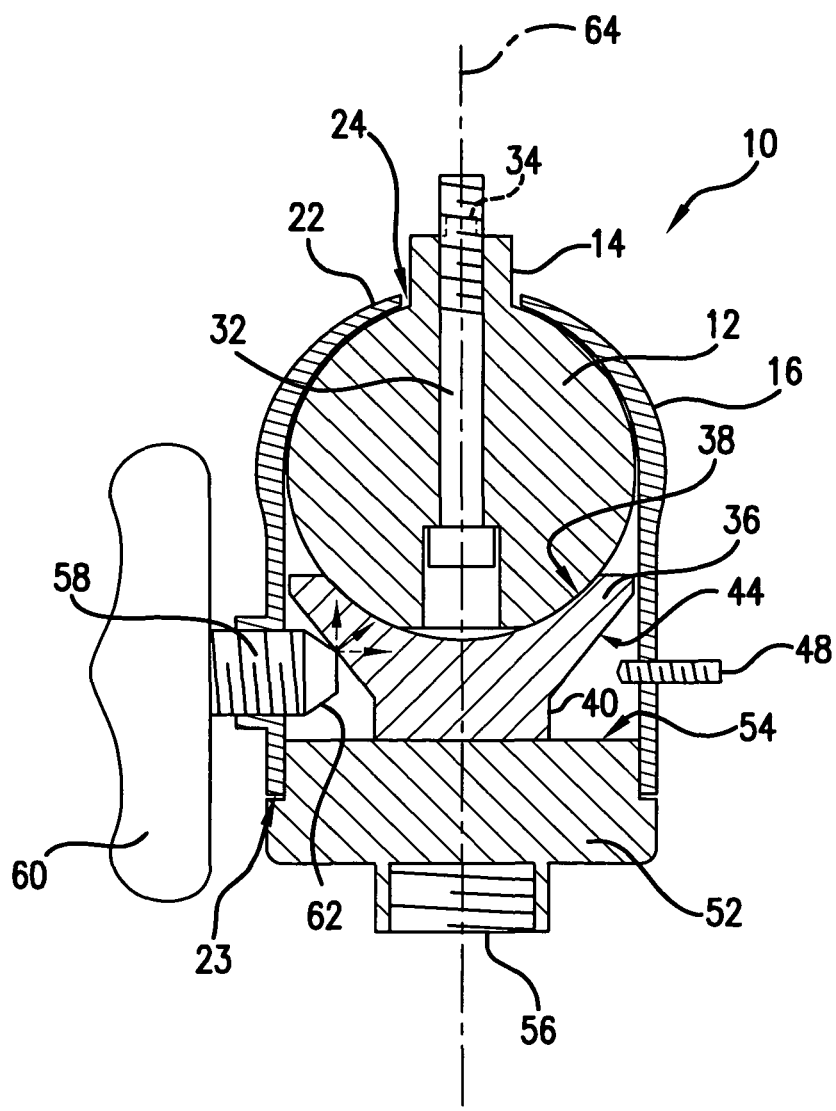
FIG. 6 is a cross-sectional view taken along line 6-6 of FIG. 5.
Figure 7:
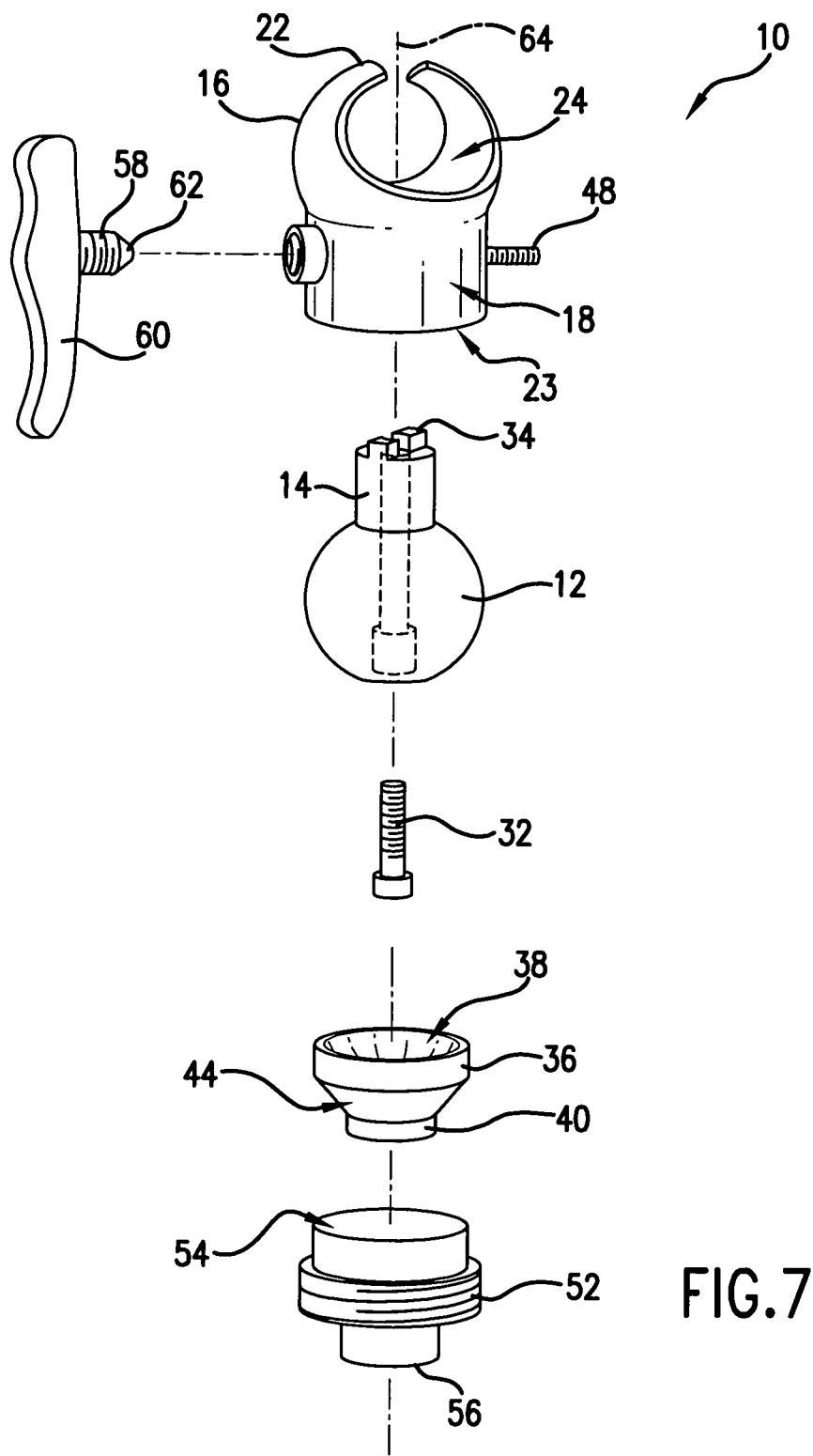
FIG. 7 is an exploded perspective view of the adjustable joint of FIG. 2.

A locking mechanism of the adjustable joint 10 is shown and described with reference to FIGS. 6 and 7. The bottom of the ball 12 may rest within a cup member 36 that is contained within the ball housing 16. The cup member 36 has a cup shaped upper section 38 that can be shaped so as to be complimentary in shape to the ball 12. In other arrangements the cup shaped upper section 38 may be shaped so as to form a ringed contact around a portion of the ball 12 so that the utmost lower portion of the ball 12 does not contact the cup shaped upper section 38. An inclined side wall 44 extends downward from the cup shaped upper section 38. A lower section 40 of the cup member 36 is located on the end of the cup member 36 opposite from the cup shaped upper section 38. A cap member 52 is rigidly attached to an end 23 of the ball housing 16 that is opposite the end 22. The attachment between the cap member 52 and the end 23 may be through a threaded connection in accordance with certain exemplary embodiments. In other arrangements, the cap member 52 may be press fit onto the end 23 or attached with mechanical fasteners. Rigid attachment of the cap member 52 to the ball housing 16 causes the cap member 52 to be fixed to the ball housing 16 so that their positions relative to one another do not change. Although described as being rigidly attached to the end 23, the cap member 52 need not be rigidly attached in other arrangements.

The lower section 40 of the cup member 36 may rest onto an upper surface 54 of the cap member 52. The cap member 36 may also have a receiving portion 56 located on its lower end. The receiving portion 56 can receive and be attached to the upper end of the column 72. The receiving portion 56 can be arranged in a variety of manners so as to effect releasable attachment to the column 72 or other component of the microphone stand assembly such as the microphone 66 in certain arrangements. Further, other arrangements are possible in which the receiving portion 56 is permanently attached to the column 72 or other portion of the microphone stand assembly such that the adjustable joint 10 is non-removable therefrom.

A tightening screw 58 may be mounted to the ball housing 16 and can extend through a wall of the ball housing 16 and into its interior. A knob 60 is located at the end of the tightening screw 58 and can be attached thereto or integrally formed therewith. A portion of the ball housing 16 is internally threaded and engages external threading on the tightening screw 58 so that rotation by the user causes the tightening screw 58 to move further into and out of the interior of the ball housing 16. A plunger 62 that has a flat surface, and an angled surface extending from the flat surface, is located at the end of the tightening screw 58. The plunger 62 can be integrally formed with the tightening screw 58 or be a separate component that is attached thereto. Actuation of the knob 60 causes the plunger 62 to move further into and out of the interior of the ball housing 16.

The tightening screw 58 is arranged so that the plunger 62 is located adjacent the inclined side wall 44. Movement of the plunger 62 against the inclined side wall 44 functions to produce forces on the cup member 36 in both the horizontal (radial) and vertical (axial) directions due to the inclined arrangement of the inclined side wall 44. A set screw 48 may be located through the wall of the ball housing 16 on a side opposite the tightening screw 58 to prevent the inclined side wall 44 from moving in the horizontal (radial) direction at a certain point. Movement of the inclined side wall 44 in the vertical (axial) direction causes the lower section 40 of the cup member 36 to lift off of the upper surface 54. Due to the rigid attachment between the cup shaped upper section 38 and the inclined side wall 44, movement of the inclined side wall 44 in the vertical (axial) direction causes the cup shaped upper section 38 to likewise be moved in the vertical (axial) direction thus applying an upward force onto the ball 12 due to the engagement between the ball 12 and the cup shaped upper section 38. Forces applied to the bottom of the ball 12 likewise cause the ball 12 to be urged upwards onto the interior surface of the ball housing 16. The ball housing 16 is a rigid member and thus will not move in response to pressure applied onto it by the ball 12. Locking of the position of the ball 12 with respect to the ball housing 16 will thus result. This locking will likewise fix the position of the stem 14 and all attached components such as the boom clutch 30, counter weight 68, boom 70, and microphone 66. The position of the microphone 66 may thus be locked into a desired location.

When adjustment is desired, the user may rotate the knob 60 in the opposite direction so as to release pressure by the plunger 62 against the inclined side wall 44 which results in the removal of locking forces between the ball 12 and the interior of the ball housing 16. The ball 12 and stem 14 along with the attached components may then be adjusted to a new position as desired. It is to be understood that the locking mechanism shown is exemplary and that others are possible in accordance with other exemplary embodiments. For example, instead of an inclined side wall 44, an insert that is wedge like in shape may be present and can be disposed within an inclined depression at the bottom of the cup member 36. The plunger 62 may be disposed within the insert and the tightening screw 58 can be actuated so that the insert can move against the cup member 36 and cause upward movement of the cup member 36 to lock the ball 12 in place.

Figure 9:
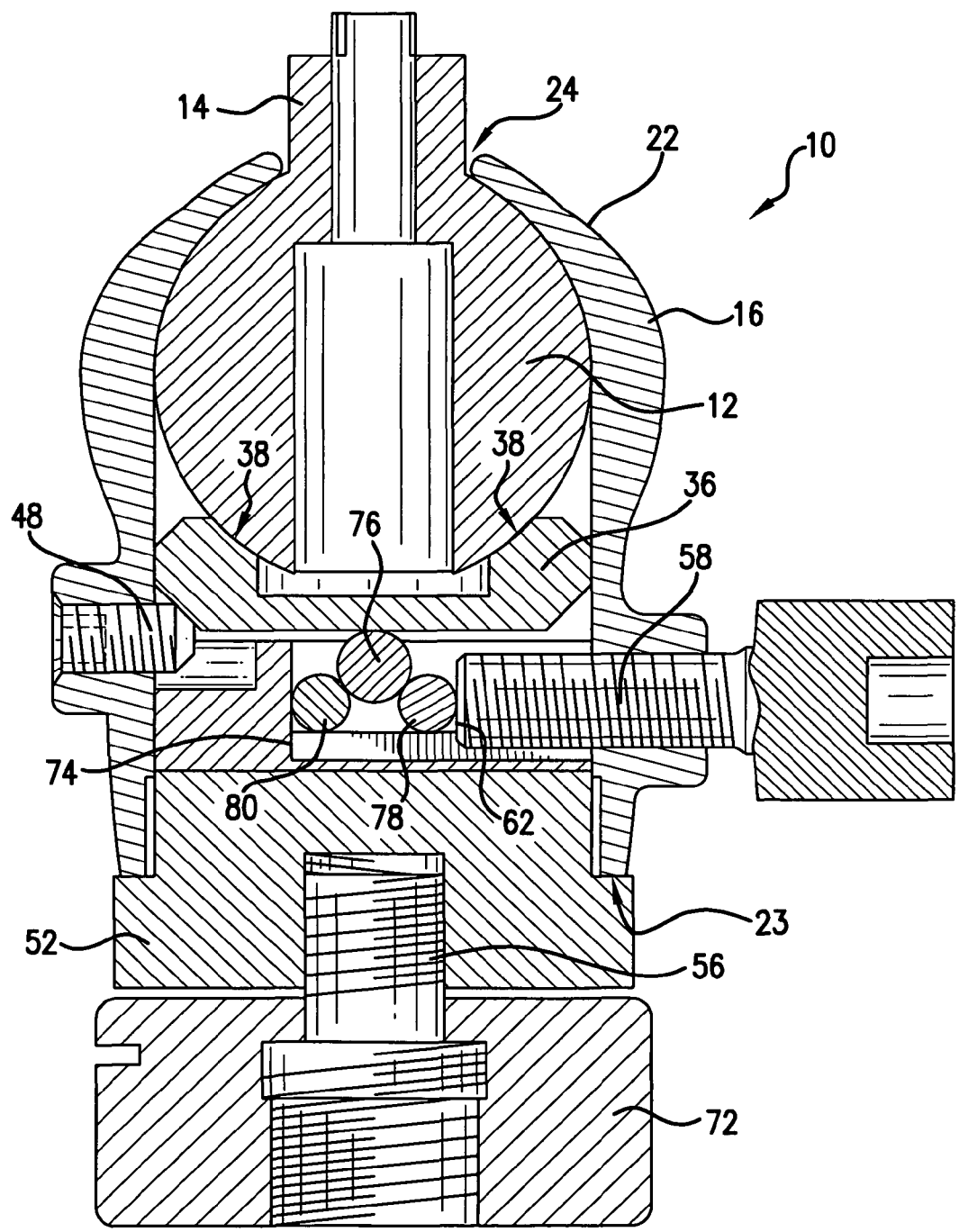
FIG. 9 is a cross-sectional view of an alternative exemplary embodiment of the adjustable joint.

FIG. 9 illustrates an alternative exemplary embodiment of the adjustable joint 10. The ball 12 and ball housing 16 are arranged in substantially the same manner as that previously discussed. A cup member 36 with a cup shaped upper section 38 may engage the outer surface of the ball 12 and force same against the interior of the ball housing 16 as in prior embodiments. An inclined surface of the cup member. 36 may engage an inclined surface of the set screw 48 in order to direct and limit the movement of the cup member 36. However, this arrangement may be modified in other embodiments. For example, the radial movement of the cup member 36 may be completely limited by the interior walls of the ball housing 16 so that the cup member 36 engages the interior walls of the ball housing 16 in both a locked and unlocked state.

The mechanism for urging the cup member 36 against the ball 12 and then subsequently against the ball housing 16 is different from that in prior exemplary embodiments. A housing 74 may be included that has a first rod 76. The tightening screw 58 can be present and may be rotated so as to move in a completely radial direction. A plunger 62 may be present at the end of the tightening screw 58. Second and third rods 78 and 80 may be present within the housing 74. The first rod 76 can be located between the second and third rods 78 and 80 and may engage the rods 78 and 80 when the adjustable joint 10 is in the unlocked position. The third rod 80 is positioned against a wall of the housing 74 and is constrained from moving any further in the radial direction due to this engagement with the housing 74. Tightening of the tightening screw 58 causes the plunger 62 to be moved into engagement with the second rod 78 to cause forces to be imparted onto all three of the rods 76, 78, and 80. Continued tightening will cause the middle, first rod 76 to be moved in the vertical, longitudinal direction as the rods 76, 78 and 80 have curved surfaces that are in engagement with one another. The vertical, longitudinal movement will cause the first rod 76 to press against the bottom of the cup member 36 and move same into engagement with the ball 12 to lock the ball 12 against the ball housing 16. The first rod 76 may have a diameter that is greater than the diameter of the second rod 78 and/or the diameter of the third rod 80.

Rotation of the tightening screw 58 so that the plunger 62 disengages the second rod 78 causes the adjustable joint 10 to be released so that the ball 12 can again move with respect to the ball housing 16. Disengagement of the plunger 62 removes forces imparted onto the rods 76, 78 and 80 so that the weight of the cup member 36 and/or the ball 12 and any attached components will push the first rod 76 down and against the second and third rods 78 and 80. The curved surface engagement of the rods 76, 78 and 80 allows the middle first rod 76 to move downward with respect to the second and third rods 78 and 80 so that the first and second rods 76 and 78 will move in the radial direction. The ball 12 may then be moved with respect to the ball housing 16. Although described as employing three rods 76, 78 and 80, it is to be understood that any number of rods may be used in accordance with other exemplary embodiments to effect locking of the adjustable joint 10.

It is to be understood that in FIG. 9, the rods 76, 78 and 80 may rest onto a platform within the housing 74 at locations proximate to their ends and not under their center section so that the plunger 62 can be moved into engagement with the rod 78 without contacting the platform of the housing 74 that supports the rods 76, 78 and 80.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An adjustable joint for use with a microphone, comprising:
    a ball;
    a stem that extends from the ball; and
    a ball housing into which the ball is located, wherein an edge of the ball housing defines a slot that has a length that extends along a portion of a front side of the ball housing and along an entire end of the ball housing and along a portion of a back side of the ball housing, wherein the slot is wider at a location at the front side of the ball housing and at a location at the back side of the ball housing than at a location at the end of the ball housing, wherein the stem is located in the slot and is capable of engaging the ball housing so as to limit movement of the ball and the stem with respect to the ball housing, wherein the edge of the ball housing from the front side of the ball housing to the back side of the ball housing is continuous so as to be continuous at the end of the ball housing along an entire length of the slot at the end of the ball housing on opposite sides of the slot at the end of the ball housing;
    a cup member inside the housing and below the ball, wherein the cup member engages the ball;
    a plunger engaged through a side of the housing below the cup member, wherein an end of the plunger projects into a chamber formed in the housing, the chamber containing:
    a first rod that has a curved outer surface, wherein the first rod has a longitudinal axis about which the curved outer surface extends, wherein said longitudinal axis is substantially perpendicular to said plunger;
    a second rod that has a curved outer surface that engages the curved outer surface of the first rod; and,
    a third rod that has a curved outer surface that engages the curved outer surface of the first rod and wherein the first rod has a diameter greater than either of the second rod or the third rod;
    wherein the second and third rods rest against a bottom surface of the chamber and are positioned below the first rod; and
    wherein the plunger is capable of engaging the second rod so as to impart force onto the second rod to move it along the bottom surface of the chamber into the first rod such that the first rod is moved in a direction perpendicular to its longitudinal axis, wherein movement of the first rod causes the first rod to be urged against the cup member which in turn causes the cup member to be urged against the bait which in turn causes the ball to be urged against the ball housing so as to limit movement of the ball and the stem with respect to the ball housing.

2. The adjustable joint as set forth in claim 1, wherein the slot at the front side of the ball housing is sized and shaped in an identical manner as the slot at the back side of the ball housing.

3. The adjustable joint as set forth in claim 1, wherein a width of the slot at the end of the ball housing is constant along the entire length of the slot at the end of the ball housing.

4. The adjustable joint as set forth in claim 1, wherein the width of the slot at the front side of the ball housing varies along an entire length of the slot at the front side of the ball housing, and wherein the width of the slot at the back side of the ball housing varies along an entire length of the slot at the back side of the ball housing.

5. The adjustable joint as set forth in claim 1, wherein the ball and the stem have a greater range of movement when the stem is located within the slot at the front side of the ball housing than when the stem is located within the slot at the end of the ball housing.

6. The adjustable joint as set forth in claim 1, further comprising a boom clutch attached to the stem.

7. The adjustable joint as set forth in claim 1, further comprising a stem axis that extends through the stem and the ball, wherein the stem and the ball are capable of rotating completely about the stem axis when the stem is located in the slot at the front side, the back side, and the end of the ball housing.

8. An adjustable joint for use with a microphone, comprising:
    a ball;
    a stem that extends from the ball;
    a ball housing into which the ball is located, wherein an edge of the ball housing defines a slot that has a length that extends along a portion of a front side of the ball housing and along a portion of an end of the ball housing, wherein a maximum width of the slot at the end of the ball housing is different than the maximum width of the slot at the front side of the ball housing, wherein the length of the slot extends along an entire end of the ball housing, wherein the edge of the ball housing from the front side of the ball housing across the entire end of the ball housing is continuous so as to be continuous at the end of the ball housing along an entire length of the slot at the end of the ball housing on opposite sides of the slot at the end of the ball housing; and a cup member inside the housing and below the ball, wherein the cup member engages the ball;

a plunger engaged through a side of the housing below the cup member, wherein an end of the plunger projects into a chamber formed in the housing, the chamber containing:

a first rod that has a curved outer surface, wherein the first rod has a longitudinal axis about which the curved outer surface extends, wherein said longitudinal axis is substantially perpendicular to said plunger;

a second rod that has a curved outer surface that engages the curved outer surface of the first rod; and a third rod that has a curved outer surface that engages the curved outer surface of the first rod and wherein the first rod has a diameter greater than either of the second rod or the third rod;

wherein the second and third rods rest against a bottom surface of the chamber and are positioned below the first rod; and wherein the plunger is capable of engaging the second rod so as to impart force onto the second rod to move it along the bottom surface of the chamber into the first rod such that the first rod is moved in a direction perpendicular to its longitudinal axis, wherein movement of the first rod causes the first rod to be urged against the cup member which in turn causes the cup member to be urged against the bait which in turn causes the ball to be urged against the ball housing so as to limit movement of the ball and the stem with respect to the ball housing.

9. The adjustable joint as set forth in claim 8, wherein the length of the slot extends along a portion of a the back side of the ball housing, wherein the stem is located in the slot and is capable of engaging the ball housing so as to limit movement of the ball and the stem with respect to the ball housing.

10. The adjustable joint as set forth in claim 9, wherein the slot at the front side of the ball housing is sized and shaped in an identical manner as the slot at the back side of the ball housing.

11. The adjustable joint as set forth in claim 10, wherein the width of the slot at the front side of the ball housing varies along the entire length of the slot at the front side of the ball housing, and wherein the width of the slot, at the back side of the ball housing varies along the entire length of the slot at the back side of the ball housing.

12. The adjustable joint as set forth in claim 9, wherein the ball and the stem have a greater range of movement when the stem is located within the slot at the front side of the ball housing than when the stem is located within the slot at the end of the ball housing.

13. The adjustable joint as set forth in claim 8, further comprising:
a cap member attached to the ball housing; and
a column of a microphone stand attached to the cap member.

14. The adjustable joint as set forth in claim 8, further comprising a boom clutch attached to the stem.

15. The adjustable joint as set forth in claim 8, wherein the stem and the ball are integrally attached to one another.

16. The adjustable joint as set forth in claim 8, further comprising a stem axis that extends through the stem and the ball, wherein the stem and the ball are capable of rotating completely about the stem axis when the stem is located in the slot at the front side and the end of the ball housing.

17. An adjustable joint for use with a microphone, comprising:
a ball;
a stem that extends from the ball;
a ball housing into which the ball is located, wherein an edge of the ball housing defines a slot that has a length that extends along a portion of a front side of the ball housing and along an entire end of the ball housing and along a portion of a back side of the ball housing, wherein the stem is located in the slot and is capable of engaging the ball housing so as to limit movement of the ball and the stem with respect to the ball housing, wherein the ball and the stem have a greater range of motion when the stem is located in the slot at the front side of the ball housing than when the stem is located in the slot at the end of the ball housing, wherein the edge of the ball housing from the front side of the ball housing to the back side of the ball housing is continuous so as to be continuous at the end of the ball housing along an entire length of the slot at the end of the ball housing on opposite sides of the slot at the end of the ball housing;

a cup member inside the housing and below the ball, wherein the cup member engages the ball; and a plunger engaged through a side of the housing below the cup member, wherein an end of the plunger projects into a chamber formed in the housing, the chamber containing:

a first rod that has a curved outer surface, wherein the first rod has a longitudinal axis about which the curved outer surface extends, wherein said longitudinal axis is substantially perpendicular to said plunger;

a second rod that has a curved outer surface that engages the curved outer surface of the first rod; and a third rod that has a curved outer surface that engages the curved outer surface of the first rod and wherein the first rod has a diameter greater than either of the second rod or the third rod;

wherein the second and third rods rest against a bottom surface of the chamber and are positioned below the first rod; and wherein the plunger is capable of engaging the second rod so as to impart force onto the second rod to move it along the bottom surface of the chamber into the first rod such that the first rod is moved in a direction perpendicular to its longitudinal axis, wherein movement of the first rod causes the first rod to be urged against the cup member which in turn causes the cup member to be urged against the bait which in turn causes the ball to be urged against the ball housing so as to limit movement of the ball and the stem with respect to the ball housing.

* * * * *